Dec. 8, 1970  P. KOTOS  3,546,534
OVEREXCITATION RELAY
Filed Jan. 31, 1968

INVENTOR:
PETER KOTOS,
BY Albert S. Richardson Jr
ATTORNEY

United States Patent Office 3,546,534
Patented Dec. 8, 1970

3,546,534
OVEREXCITATION RELAY
Peter Kotos, Havertown, Pa., assignor to General Electric Company, a corporation of New York
Filed Jan. 31, 1968, Ser. No. 702,104
Int. Cl. H02h 7/04
U.S. Cl. 317—14           8 Claims

ABSTRACT OF THE DISCLOSURE

To indicate over-excitation of an electric power transformer, a relay responsive to volts-per-hertz is provided. The relay comprises a resistive component in series with a reactive component, and a level detector designed to operate whenever the magnitude of the average voltage across a certain one of said components attains a predetermined threshold level. The components are energized in accordance with transformer voltage, and the impedance of said one component is substantially lower than that of the other over a relatively wide range of frequencies, whereby level detector operation is dependent upon the magnitude-to-frequency ratio of the transformer voltage.

---

This invention relates generally to means for protecting generator step-up transformers against the effects of overexcitation. It has heretofore been recognized that a generator step-up transformer can be seriously damaged by overexcitation. The term "over-excitation" refers to a condition of excessive magnetic flux which tends to saturate the transformer core and to cause overheating. In general, such a condition is most likely to occur during either the start-up or the shut-down operation of a unit generator-transformer. If suitable corrective action is not promptly initiated, transformer insulation will weaken or fail, and short circuits can occur. The adverse economic consequences of removing a damaged transformer from service for repair can be severe.

Generator voltage regulators cannot be relied on to prevent all overexcitation conditions from occurring. The regulator may experience a malfunction, or it may be temporarily out of service. Furthermore, overexcitation can be caused by reduced frequency as well as by overvoltage. Probably the most accurate indication of whether the transformer is operating within safe limits of excitation is the relationship between voltage and frequency at the transformer terminals. Consequently, a protective relay is needed that operates in response to a ratio of voltage magnitude to frequency over a wide range.

Instantaneous overvoltage relays of the types commercially available for protective relaying applications have pick-up characteristics which closely approximate the desired response. However, such relays tend to deviate from the ideal characteristic at frequencies under about one-half normal rating. Furthermore, their volts-per-hertz characteristic varies with different pick-up settings.

Accordingly, a general objective of my invention is to provide an improved protective relay having a voltage vs. frequency operating characteristic that remains truly linear at various pick-up settings over a relatively wide range of frequencies.

Another objective is to provide an improved overexcitation relay that is characterized by an extremely high (e.g., at least 98 percent) dropout-to-pickup ratio and that is relatively insensitive to transient quantities.

In carrying out my invention in one form, I provide a sensing unit having a substantially constant volts/hertz pickup over a range of 15–72 Hz., in combination with a timing unit that introduces a definite time delay between the pickup of the sensing unit and the initiation of corrective action. The sensing unit comprises a resistor, a capacitor, and a level detector. The resistor and the capacitor are serially interconnected for energization by a voltage representative of the voltage impressed on the protected transformer. The level detector is connected across the capacitor and operates (picks up) whenever the average magnitude of capacitor voltage attains a predetermined threshold level. The constant volts/hertz characteristic results from using a capacitor whose ohmic impedance, over the above-mentioned frequency range, is substantially lower than (e.g., less than 20 percent) the resistance in series therewith.

My invention will be better understood and its various objects and advantages will be more fully appreciated from the following description taken in conjunction with the accompanying drawing in which.

Figure 1:
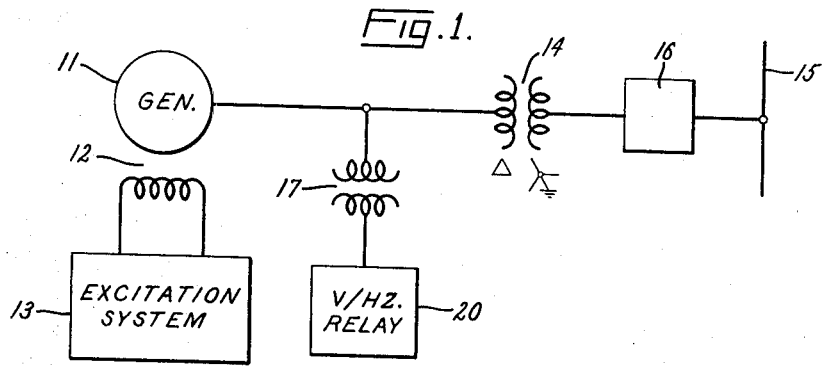
FIG. 1 is a schematic one-line diagram of a typical unit generator-transformer system.

I have included FIG. 1 in the present drawing for the purpose of illustrating one practical application of an overexcitation relay embodying my invention. FIG. 1 depicts an electric power generator 11 having a field winding 12 which is energized by a conventional excitation system 13. The generator is mechanically driven by a steam turbine or other suitable prime mover (not shown), and it generates 3-phase alternating voltage at 60 Hz. (i.e., 60 cycles per second). The output terminals of the generator are directly connected to a step-up transformer 14 whose high voltage windings are connected to a high voltage bus 15 by way of a circuit breaker 16. A set of potential transformers 17 is used for conventional regulating, metering, and protective relaying purposes and for suppling a volts/hertz relay 20 with an input voltage that is representative, in magnitude and frequency, of the voltage impressed on the step-up transformer 14. The magnitude and frequency of this voltage will vary during the start-up and shut-down of the generator 11, and the relay 20 detects overexcitation of the transformer 14 during these and other operating conditions.

Figure 2:
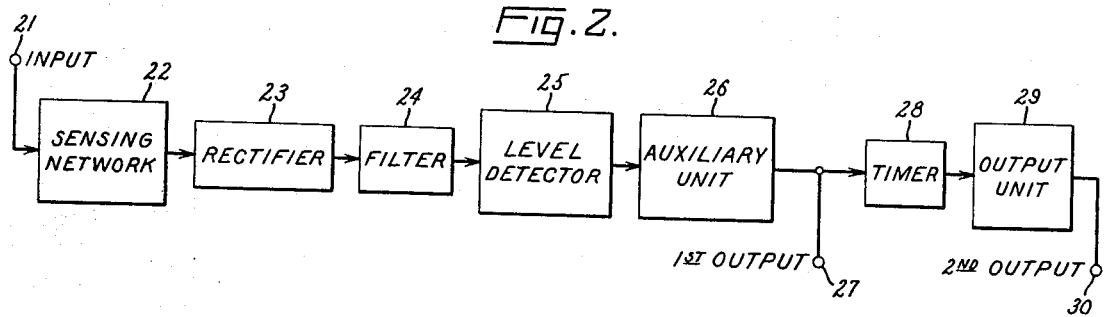
FIG. 2 is an expanded functional block diagram of the v./Hz. relay shown as a single block in FIG. 1.

A preferred embodiment of the volts/hertz relay 20 is shown functionally in FIG. 2. The input 21 of the relay is adapted to be energized by the representative voltage. A sensing network 22 converts the voltage applied to the input 21 into an alternating voltage whose average magnitude is proportional to the magnitude-to-frequency ratio of the applied voltage, and the converted voltage is rectified by a rectifier 23 and smoothed by a filter 24. A static level detector 25 is connected to the filter 24. This detector, which has an extremely high dropout-to-pick-up ratio, is operative only when the average magnitude of the converter voltage equals or exceeds a predetermined threshhold level, which level reflects overexcitation of the generator step-up transformer 14. An auxiliary unit 26 responds to operation of the level detector 25 by immediately producing at a first output 27 of the relay 20 a signal indicating that overexcitation has occurred. Simultaneously with the appearance of the first output signal at 27, a timer 28 is activated, and on the expiration of a predetermined interval of time thereafter, an output unit 29 responds by producing a predetermined control signal at a second output 30 of the relay. The delayed output at 30 can be used to initiate a desired protective function, such as, for example, tripping the field breaker associated with the generator field 12 or, alternatively, it can effect runback of the field exciter rheostat to reduce generator voltage.

Figure 3:
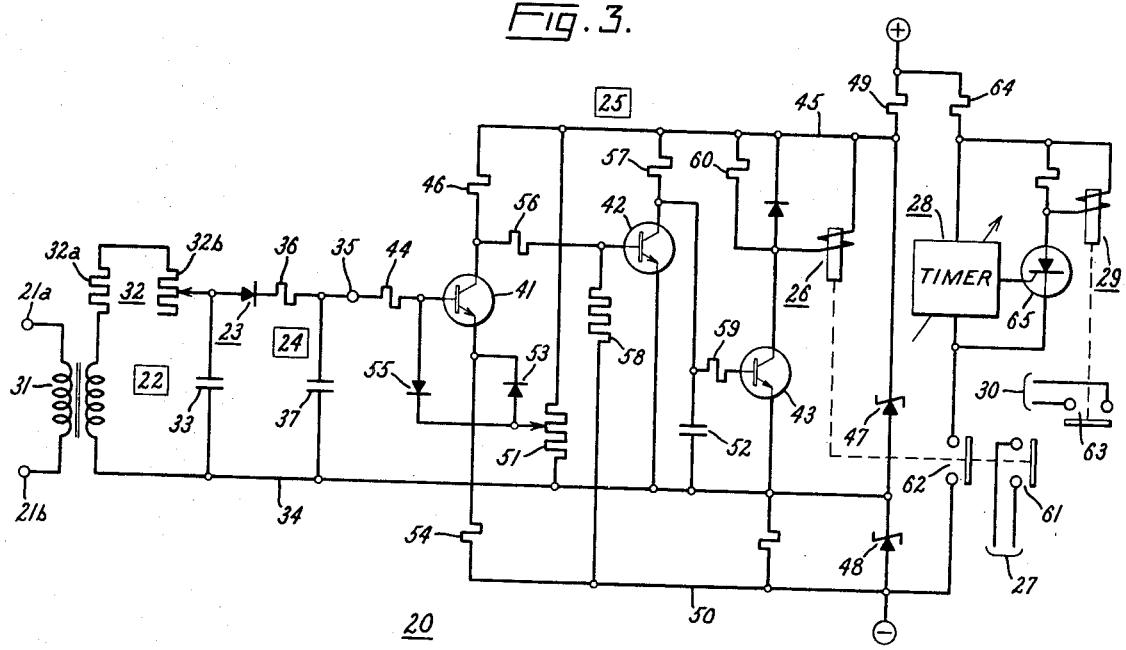
FIG. 3 is a schematic circuit diagram of a preferred embodiment of the FIG. 2 relay.

I have shown in FIG. 3 a schematic circuit diagram of a preferred embodiment of the volts/hertz relay outlined above. In FIG. 3 the relay input is seen to comprise a pair of A-C terminals 21a and 21b, and the sensing network 22 is connected between these terminals. The network 22 comprises an isolating transformer 31 and a series RC circuit 32, 33 as shown. The resistive component 32 of the RC circuit includes a fixed resistor 32a and a variable resistor or rheostat 32b. One plate of the associated capacitor 33 is connected to a reference bus 34, and the opposite plate is connected to a terminal 35 by way of the rectifier 23 and the filter 24. The rectifier 23 is shown as a simple diode, and the filter 24 is shown as a resistor 36 in combination with a capacitor 37. Consequently there is developed between the terminal 35 and the reference bus 34 a relatively smooth D-C voltage representative of the average voltage across the capacitor 33 of the sensing network. By designing the sensing network in the manner described in the following paragraph, the magnitude of the average voltage across the capacitor 33 is made dependent upon the magnitude-to-frequency ratio of the voltage energizing the relay input terminals 21a and 21b.

The impedance of the capacitor 33 ($X_c$ ohms) is selected to be substantially lower than the impedance of the associated resistive component 32 (R ohms) over a relatively wide range of frequencies (e.g., 15–72 Hz.). For example, the parameters might be chosen so that the resistance of the fixed resistor 32a is 18,000 ohms, the in-circuit resistance of the rheostat 32b is about 7,000 ohms, and the capacitance of the capacitor 33 is 5 microfarads, whereby $X_c$ is less than 0.1 R at 15 Hz. Consequently $X_c$ can be neglected when calculating the current $i$ flowing through the serially interconnected resistor 32a, rheostat 32b, and capacitor 33, and $i$ can therefore be assumed to be directly proportional to the magnitude of the input voltage applied to the terminals 21a and 21b. The voltage across the capacitor 33 is equal to $iX_c$. Since $X_c$ is inversely proportional to the fundamental frequency of the applied voltage, and $i$ is proportional to the magnitude of the same voltage, it is apparent that the capacitor voltage will be proportional to the volts-to-hertz ratio of the applied voltage. This same result can be obtained by substituting an inductor for the resistive component 32 and a resistor for the capacitive component 33, with the resistance of the substituted resistor being substantially lower than the inductive reactance of the inductor over the prescribed frequency range. Alternatively, saturable reactors and resistors could be used in the sensing network 22.

As is shown in FIG. 3, the level detector 25 is connected between terminal 35 and the reference bus 34. Preferably the level detector comprises three NPN transsistors 41, 42, and 43. Normally transistors 41 and 43 are turned off (not conducting) and transistor 42 is turned on (conducting). Operation of the level detector involves turning on transistor 41 which, in cascade fashion, turns off transistor 42 which permits transistor 43 to turn on.

The base of the normally off transistor 41 is connected to the terminal 35 by means of a resistor 44, and the collector of the same transistor is connected to a relatively positive supply voltage bus 45 by way of a resistor 46. The magnitude of the supply voltage is regulated by a pair of duplicate Zener diodes 47 and 48 which are connected in series with a resistor 49 to any suitable source of D-C control power. The reference bus 34 is connected to the junction of the Zener diodes, and a relatively negative supply voltage bus 50 is connected to the negative terminal of the D-C source. By way of example, the breakdown voltages of the Zener diodes 47 and 48 are selected so that the potentials on buses 45, 34, and 50 are +9, 0, and —9 volts, respectively.

The emitter of the transistor 41 is connected to a voltage divider 51 spanning the positive supply voltage bus 45 and the reference bus 34, whereby the emitter potential is normally biased positively with respect to the reference bus. A bias of +3 volts is appropriate. So long as the potential of the terminal 35 is less than this bias, the transistor 41 cannot turn on and the level detector 25 will remain in an inoperative state. In order to forward bias the emitter-base junction of the transistor 41 and consequently to effect operation of the level detector, the voltage between the terminal 35 and the reference bus 34 must attain a pickup or threshold level approximately equal to the preset bias. This threshold level of voltage to which the level detector responds corresponds to a predetermined volts-per-hertz ratio of the relay input voltage; the actual volts-per-hertz ratio at pickup will be determined by the setting of the rheostat 32b in the sensing network 22. Thus the rheostat 32b provides means for varying the critical amount of volts/hertz that causes relay operation. Typically the setting is 110 percent of the volts-per-hertz ratio obtained when the step-up transformer 14 is subjected to normal excitation.

To improve accuracy and temperature stability of the level detector 25, the emitter of the transistor 41 has been connected to the voltage divider 51 through a reversely poled, forward biased diode 53. It is necessary to maintain this diode in a continuously forward conducting, low-impedance state, in which state it has no appreciable blocking effect, and for this purpose a constant current source comprising a resistor 54 and the relatively positive and negative D-C supply voltage buses 45 and 50 is connected across the diode 53. To promote a high dropout-to-pickup ratio, the emitter-base junction of the transistor 41 is shunted by a diode 55 as shown in FIG. 3. With this arrangement the transistor 41 will resume its normally off state as soon as the voltage at terminal 35 decays to a magnitude that is approximately 98 percent of the threshold level.

Turning on the transistor 41 causes the normally conducting transistor 42 to turn off. The latter transistor has its base connected to the collector of the transistor 41 by way of a resistor 56, its collector connected to the positive supply voltage bus 45 by way of a resistor 57, and its emitter connected directly to the reference bus 34. In addition, the base of the transistor 42 is connected through a resistor 58 to the negative supply voltage bus 50. The resistances of resistors 46, 56, and 58 are so proportioned that the emitter-base junction of transistor 42 is forward biased except when collector current is flowing in transistor 41, in which event the transistor 42 stops conducting.

The collector of transistor 42 is connected via a resistor 59 to the base of the third transistor 43 whose collector is connected through a resistor 60 to the positive bus 45. The emitter of the transistor 43 is connected directly to the reference bus 34, and the emitter-base junction of this normally off transistor becomes forward biased as the collector potential of the transistor 42 goes positive (with respect to the reference bus) in response to 42 turning off. The latter action is delayed, however, by a capacitor 52 that is connected between the collector of transistor 42 and the reference bus 34, whereby operation of the level detector 25 is prevented if the voltage at terminal 35 equals or exceeds the critical threshold level only temporarily (e.g., for less than one-half second). This feature of the level detector avoids false response to transient quantities which can occur if voltage is suddenly applied to the relay input terminals 21a and 21b.

When the transistor 43 turns on, it activates the auxiliary unit 26. In FIG. 3 the auxiliary unit 26 is illustrated as an electromagnetic relay having an operating coil and two sets of normally-open contacts 61 and 62. The operating coil is connected in parallel with the collector resistor 60 of the transistor 43, whereby the unit 26 picks up upon operation of the level detector 25. Closure of the first set of contacts 61 provides a signal at the first output 27 of the overexcitation relay 20. This signal can be used to activate an alarm or other means for indicating that overexcitation has just occurred. Closure of the second set of contacts 62 activates electroresponsive means comprising the timer 28 and the output unit 29, the latter providing a delayed signal at the second output 30 that can be used to initiate a suitable protective or corrective function if overexcitation persists for an interval of time preset by the timer.

As can be seen in FIG. 3, the output unit 29 comprises a normally deenergized electromagnetic relay having an operating coil and a set of normally-open contacts 63. The operating coil is connected in series with a resistor 64 and a controlled rectifier 65 for energization by the D-C control power source whenever the rectifier 65 is triggered. A trigger signal will be supplied to the gate electrode of the controlled rectifier 65 by the timer 28 in delayed response to the set of contacts 62 closing the circuit between the timer and the negative supply voltage bus 50. The timer 28 can be of any known construction having a variable delay time in the range of approximately 0.5 to 15 seconds, and preferably it is characterized by fast reset when deenergized as a result of the contact 62 opening.

In summary, the magnitude-to-frequency ratio of the voltage applied to the input terminals of the relay 20 under normal excitation conditions is below the pickup setting of the relay, and, therefore, the units 26 and 29 are both inactive and their respective contacts are open as shown. When, however, the excitation of the step-up transformer 14 is abnormally high, and the volts/hertz ratio of the relay input voltage equals or exceeds the pickup setting, the unit 26 is activated and its two sets of normally open contacts 61 and 62 close. The first set of contacts 61 is used to give immediate warning of the overexcitation condition, and the other set of contacts 62 activates the timer 28. If the overexcitation condition persists for longer than the timing cycle of the timer 28, the output unit 29 is activated and its set of normally open contacts 63 will close. The latter contacts can be used to initiate corrective action. If the duration of the overexcitation condition were shorter than the time setting of timer 28, unit 26 will drop out, the timer will quickly reset, and the relay 20 will return to its normal state. Tests performed on my relay at various pickup settings have confirmed that the pickup voltage magnitude vs. frequency characteristic of the relay is substantially linear over the full frequency range 15–72 hertz. By substantially linear I mean that the maximum deviation in pickup from theoretical values is less than two percent.

While I have shown and described the preferred form of my invention by way of illustration, many modifications will occur to those skilled in the art. I therefore contemplate by the claims which conclude this specification to cover all such modifications as fall within the true spirit and scope of my invention.

What I claim as new and desire to secure by United States Letters Patent is:

1. In combination:
   (a) a set of A-C input terminals adapted to be energized by alternating voltage the magnitude and frequency of which may vary;
   (b) a sensing network connected between said input terminals, said network comprising a resistive component in series with a reactive component, the ohmic impedance of one of said components being substantially lower than that of the other over the expectable frequency range of said alternating voltage;
   (c) first means connected to said one component and operative in delayed response to the magnitude of the average voltage across said one component attaining a predetermined threshold level; and
   (d) second means associated with said first means for initiating a predetermined protective function in response to operation of said first means.

2. The combination of claim 1 in which said second means includes means for delaying, for a preset interval of time, its response to the operation of said first means.

3. The combination of claim 1 in which said first means comprises a rectifier connected to said one component, a filter connected to said rectifier, and a level detector connected to said filter, said level detector being operative only when the magnitude of the average voltage across said one component equals or exceeds said predetermined threshhold level for at least a predetermined length of time; and in which said second means comprises electroresponsive means connected to said level detector for initiating said predetermined protective function in response to level detector operation.

4. The combination of claim 3 in which said level detector, once operated, is arranged to stop operating as soon as the magnitude of said average voltage decays to a predetermined dropout level which is only slightly below said predetermined threshhold level.

5. The combination of claim 3 in which said electroresponsive means includes means for delaying its response to level detector operation.

6. The combination of claim 1 in which said one component comprises a capacitor and the other component is resistive.

7. The combination of claim 1 in which the ohmic impedance of said other component is variable, whereby the preset magnitude-to-frequency ratio of said alternating voltage at which said threshhold level is attained can be varied.

8. Improved means for indicating overexcitation of an electric power transformer comprising:
   (a) a sensing network comprising a resistive component in series with a reactive component, the ohmic impedance of one of said components being substantially lower than that of the other over a relatively wide range of frequencies;
   (b) means for applying across said sensing network a voltage representative, in magnitude and frequency, of the voltage applied to said transformer; and
   (c) means connected across said one component of said sensing network for indicating overexcitation in response to the magnitude of the average voltage across said one component attaining a predetermined threshhold level.

References Cited

UNITED STATES PATENTS

| | | | |
|---|---|---|---|
| Re. 25,762 | 4/1965 | Kotheimer | 317—36 |
| 3,141,122 | 7/1964 | Loocke | 318—148 |
| 3,343,063 | 9/1967 | Keeney et al. | 321—5 |
| 3,351,835 | 11/1967 | Borden et al. | 318—227 |

JAMES D. TRAMMELL, Primary Examiner

U.S. Cl. X.R.

317—33, 36; 322—24